United States Patent [19]
Daoud

[11] Patent Number: 6,161,803
[45] Date of Patent: Dec. 19, 2000

[54] EXPANDABLE WIRING TROUGH FOR TELECOMMUNICATIONS EQUIPMENT

[75] Inventor: Bassel H. Daoud, Parsippany, N.J.

[73] Assignee: Lucent Technologies Inc., Murray Hill, N.J.

[21] Appl. No.: 09/141,915

[22] Filed: Aug. 28, 1998

[51] Int. Cl.[7] ................................. F16L 3/23; F16L 3/06; F16L 3/10
[52] U.S. Cl. .................... 248/68.1; 248/316.4; 174/72 A
[58] Field of Search ............................... 248/68.1, 65, 73, 248/74.1, 298.1, 316.4, 231.41, 74.4; 174/72 A

[56] References Cited

U.S. PATENT DOCUMENTS

| | | | |
|---|---|---|---|
| 1,384,437 | 7/1921 | Edelmann | 248/68.1 X |
| 3,659,319 | 5/1972 | Erickson | 248/74.1 X |
| 4,023,758 | 5/1977 | Yuda | 248/73 |
| 4,118,838 | 10/1978 | Schiefer et al. | 248/68.1 X |
| 4,244,083 | 1/1981 | Aremka et al. | 248/74.4 |
| 4,525,904 | 7/1985 | Petri | 248/73 X |
| 4,526,333 | 7/1985 | Nakama et al. | 248/73 |
| 5,024,408 | 6/1991 | Magee | 248/316.4 X |
| 5,351,927 | 10/1994 | Howell | 248/316.4 |
| 5,779,206 | 7/1998 | Harris et al. | 248/298.1 X |
| 5,797,566 | 8/1998 | Sato | 174/72 A X |
| 5,929,381 | 7/1999 | Daoud | 174/72 A |

*Primary Examiner*—Ramon O. Ramirez
*Assistant Examiner*—Jon A Szumny
*Attorney, Agent, or Firm*—Steve Mendelsohn

[57] ABSTRACT

A wiring trough for an enclosure for telecommunications equipment (such as a building entrance protector) has a male piece adapted to be received by a female piece at a number of different positions to define an opening having different sizes to accommodate different amounts of wiring. As the amount of wiring needed to be handled increases (e.g., as more enclosures are stacked end to end on a wall one on top of the other), the two-piece wiring trough can be reconfigured without having to remove the wiring trough from the enclosure to expand the size of its opening to accommodate the larger amount of wiring.

16 Claims, 5 Drawing Sheets

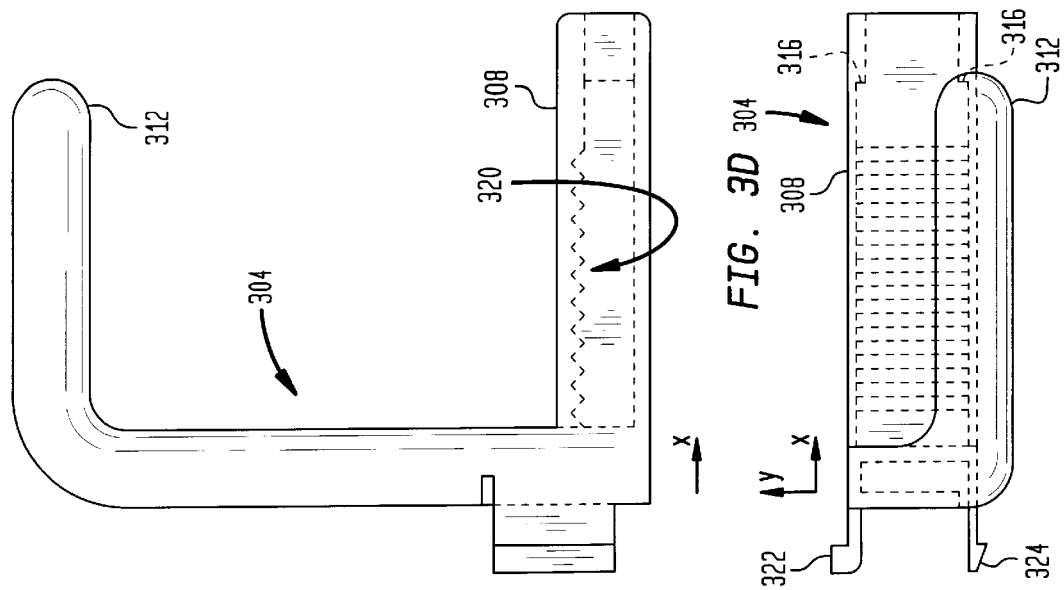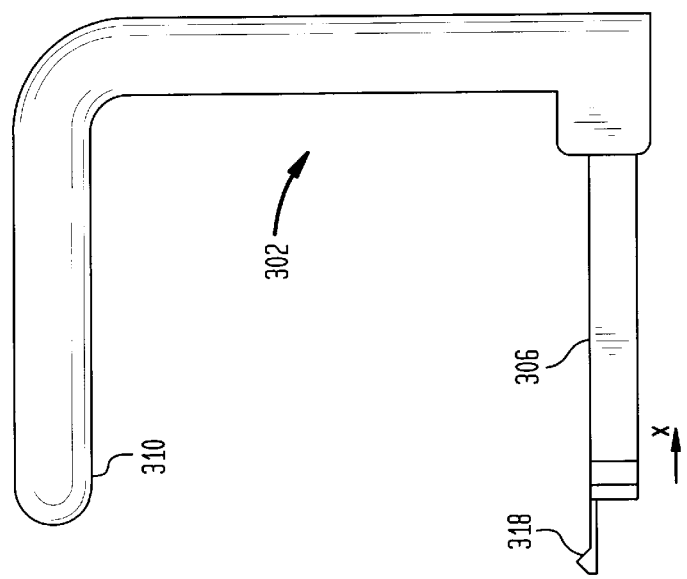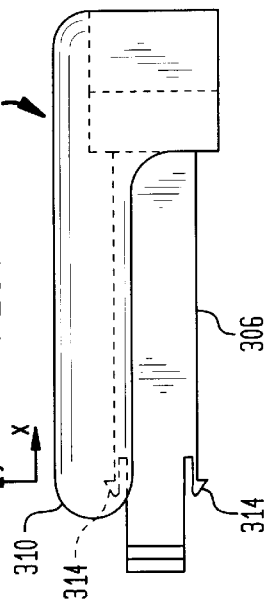

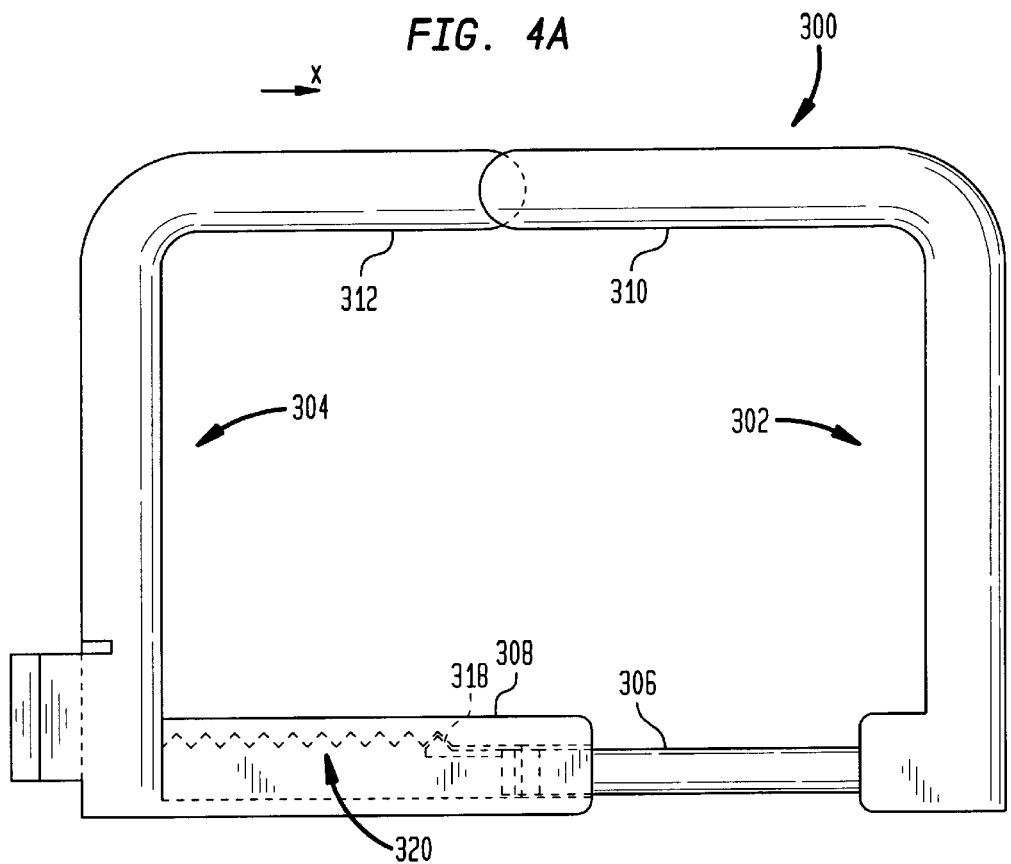
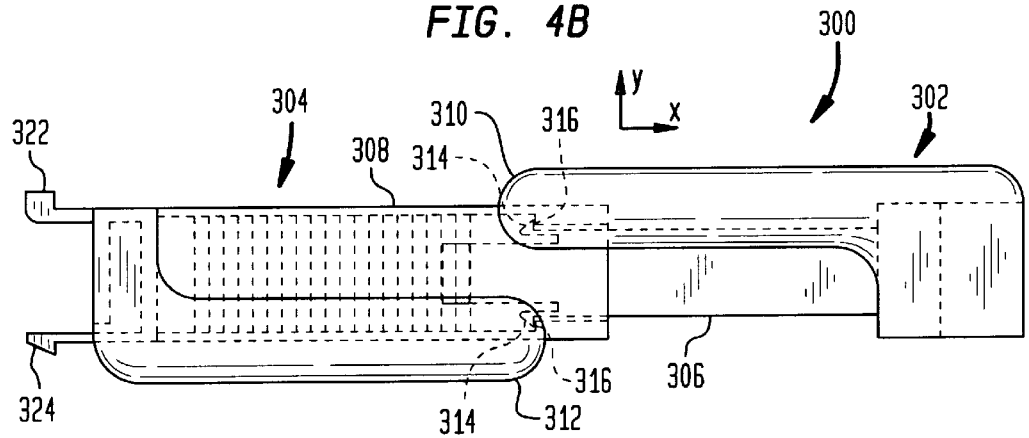

EXPANDABLE WIRING TROUGH FOR TELECOMMUNICATIONS EQUIPMENT

BACKGROUND OF THE INVENTION

1. Field of the Invention

The present invention relates to telecommunications equipment, and, in particular, to enclosures for housing and protecting telecommunications equipment.

2. Description of the Related Art

A building entrance protector (BEP) is an enclosure used to house and protect telecommunications equipment. For example, a BEP may house the components used to interface between a multi-wire cable providing telephone service to a building and the twisted pairs of copper wire for individual telephones distributed throughout the building. These interface components may include splicing connectors used to break out pairs of wires from a multi-wire cable, as well as electrical isolation interface components, such as protector panels used to receive high-voltage/high-current plug-in protectors, and connectors, such as insulation displacement connectors (IDCs), used to terminate twisted pairs from individual telephones. The BEP may have two or more hinged pieces that define one or more different compartments within the BEP for such functions as breaking out twisted pairs of wires from the multi-wire cable, connecting the twisted pairs to electrical isolation components, connecting the electrical isolation components to IDC connectors, and terminating the twisted pairs at the IDC connectors.

FIG. 1 shows a conventional building entrance protector 10 configured with two removable wiring troughs 72 that assist in the organization and bundling of wiring 30 terminated at BEP 10. FIG. 2 shows a perspective view of one of wiring troughs 72 of FIG. 1. Wiring troughs 72 are designed with an opening 80 large enough accommodate the maximum amount of wiring expected to be terminated at BEP 10. For buildings having a relatively large number of telephones and/or other telecommunications equipment, it has become common practice to stack two or more BEI's, like BEP 10 of FIG. 1, end to end on a wall one on top of the other to efficiently utilize what may be a limited amount of mounting area designated for such purposes. In these cases, it may be desirable to route additional wiring from one or more other BEPs through the wiring trough of a particular BEP. In such applications, the amount of wiring that a wiring trough needs to accommodate may be greater than the maximum amount of wiring that can be accommodated by wiring troughs 72.

Simply making the wiring trough larger so that it can accommodate more wiring has the disadvantage of decreasing the ability of that wiring trough to effectively control the bundling of wires when relatively small amounts of wiring are used. Moreover, when there are small amounts of wiring, using large wiring troughs wastes wall mounting space.

Another approach is to provide a number of differently sized wiring troughs for different situations, but this is not an attractive solution. First of all, it requires maintaining a supply of different types of wiring troughs. It is also difficult and inconvenient to have to replace a relatively small wiring trough with a relatively large wiring trough for an existing BEP when the amount of wiring increases (e.g., as more telephones and/or more adjacent BEPs are added to a configuration).

SUMMARY OF THE INVENTION

The present invention is directed to an expandable wiring trough for use with building entrance protectors and other telecommunications equipment. According to embodiments of the present invention, the wiring trough is a two-piece assemblage whose pieces can be moved relative to one another to define clearance openings of different sizes to accommodate different amounts of wiring for different applications.

In one embodiment, the present invention is an expandable wiring trough for an enclosure for telecommunications equipment, the wiring trough comprising a male piece and a female piece, adapted to receive the male piece at a plurality of positions defining an opening having different sizes to accommodate different amounts of wiring. In an alternative embodiment, the present invention is an enclosure for telecommunications equipment, the enclosure having at least one expandable wiring trough, each wiring trough comprising a male piece and a female piece, adapted to receive the male piece at a plurality of positions defining an opening having different sizes to accommodate different amounts of wiring.

BRIEF DESCRIPTION OF THE DRAWINGS

Other aspects, features, and advantages of the present invention will become more fully apparent from the following detailed description, the appended claims, and the accompanying drawings in which:

FIGS. 3A–D show side and end views of the male and female pieces of a two-piece expandable wiring trough, according to one embodiment of the present invention;

FIGS. 4A and 4B show side and end views, respectively, of the expandable wiring trough of FIGS. 3A–D in its fully extended configuration.

DETAILED DESCRIPTION

FIGS. 3A–D show side and end views of the male and female pieces of a two-piece expandable wiring trough 300, according to one embodiment of the present invention. In particular, FIGS. 3A and 3B show side and end views, respectively, of male piece 302, while FIGS. 3C and 3D show side and end views, respectively, of female piece 304.

Figure 5A:
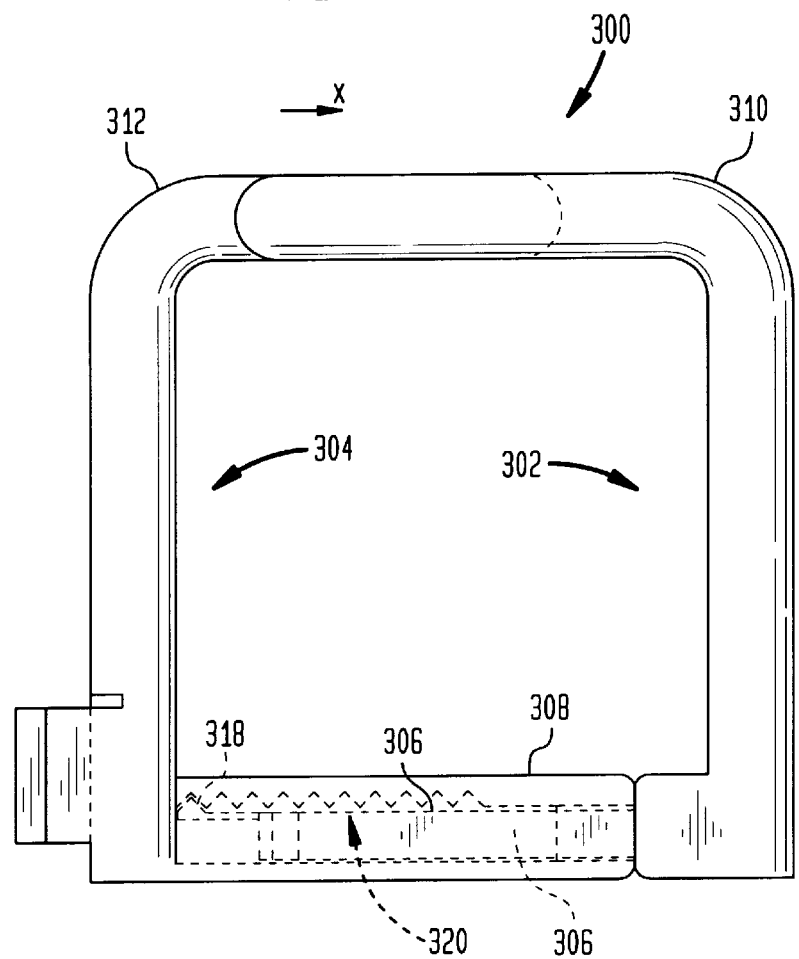
FIGS. 5A and 5B show side and end views, respectively, of the expandable wiring trough of FIGS. 3A–D, in its fully compressed configuration.
Figure 5B:
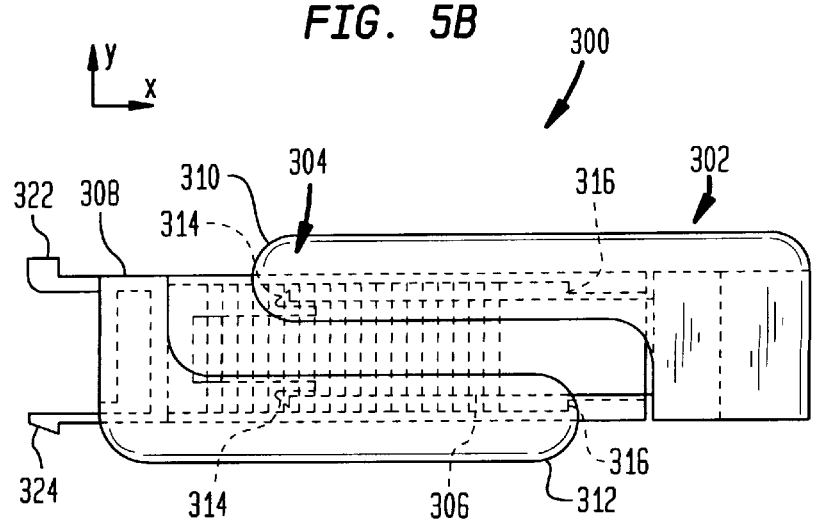

FIGS. 4A and 4B show side and end views, respectively, of expandable wiring trough 300 of FIG. 3 formed from male and female pieces 302 and 304, in its fully extended configuration. FIGS. 5A and 5B show side and end views, respectively, of expandable wiring trough 300 of FIGS. 3A–D, in its fully compressed configuration.

When wiring trough 300 is assembled, arm 306 of C-shaped male piece 302 is received within arm 308 of C-shaped female piece 304 to form a D-shaped assemblage. The size of the D-shaped opening depends on the position of male piece 302 relative to female piece 304. Male arm 306 has two extensions 314 (see FIG. 3B) with triangular-shaped ends that allow male arm 306 to be inserted within female arm 308, but which engage stops 316 within female arm 308 (see FIG. 3D) to prevent male arm 306 from being easily removed from within female arm 308 (see FIG. 4B).

In addition, male arm 306 has an extension 318 having a triangular-shaped end that engages a saw-toothed inner surface 320 of female arm 308 to provide a finite number of configurations for positioning male part 302 relative to female part 304. The shape of the triangular end of extension 318 relative to the shape of the triangular saw teeth of surface 320 dictates how easy or hard it is to change the configuration of male piece 302 relative to female piece 304. In the embodiments shown in FIGS. 3–5, the triangular-shaped end of extension 318 and saw teeth of surface 320 are based on isosceles triangles having 90-degree apex angles. Those skilled in the art will understand that larger apex angles will result in less force being required to change the configuration of the wiring trough, and smaller apex angles will result in more force being so required. Furthermore, shapes other than isosceles triangles may be used to produce a wiring trough that is, for example, easier to compress than to expand.

Retaining arm 310 of male piece 302 is offset in the Y direction relative to retaining arm 312 of female piece 304 to provide clearance in the Y direction between retaining arms 310 and 312, while overlapping in the X direction when the two pieces are assembled together. The clearance in the Y direction enables a wire to be inserted within (or removed from) the D-shaped opening formed by the wiring trough without having to thread an end of the wire through the opening, while the overlapping in the X direction helps keep the inserted wires from inadvertently falling out of the wiring trough.

Figure 1:
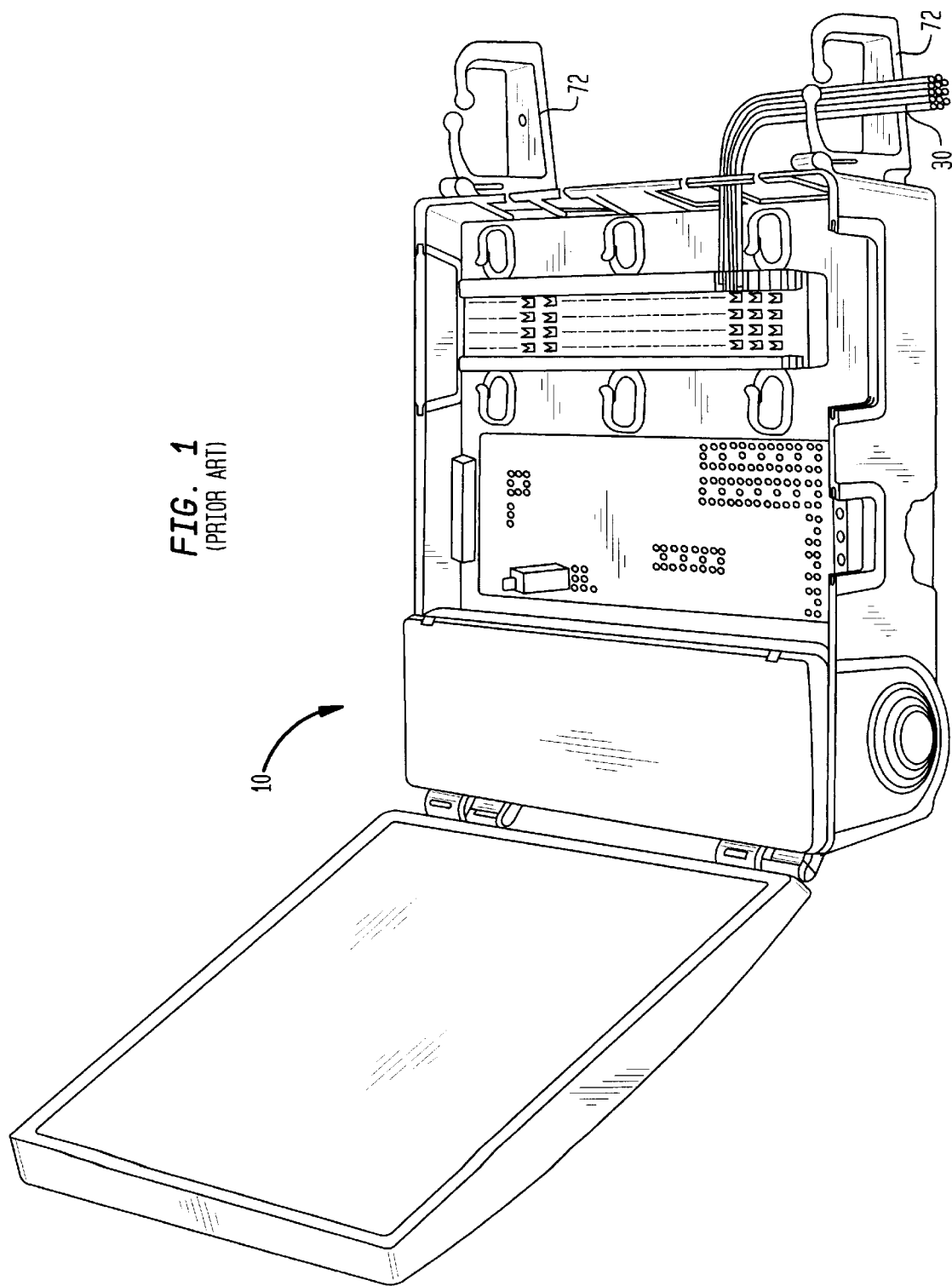
FIG. 1 shows a conventional building entrance protector configured with two removable wiring troughs that assist in the organization and bundling of wiring terminated at the BEP.
Figure 2:
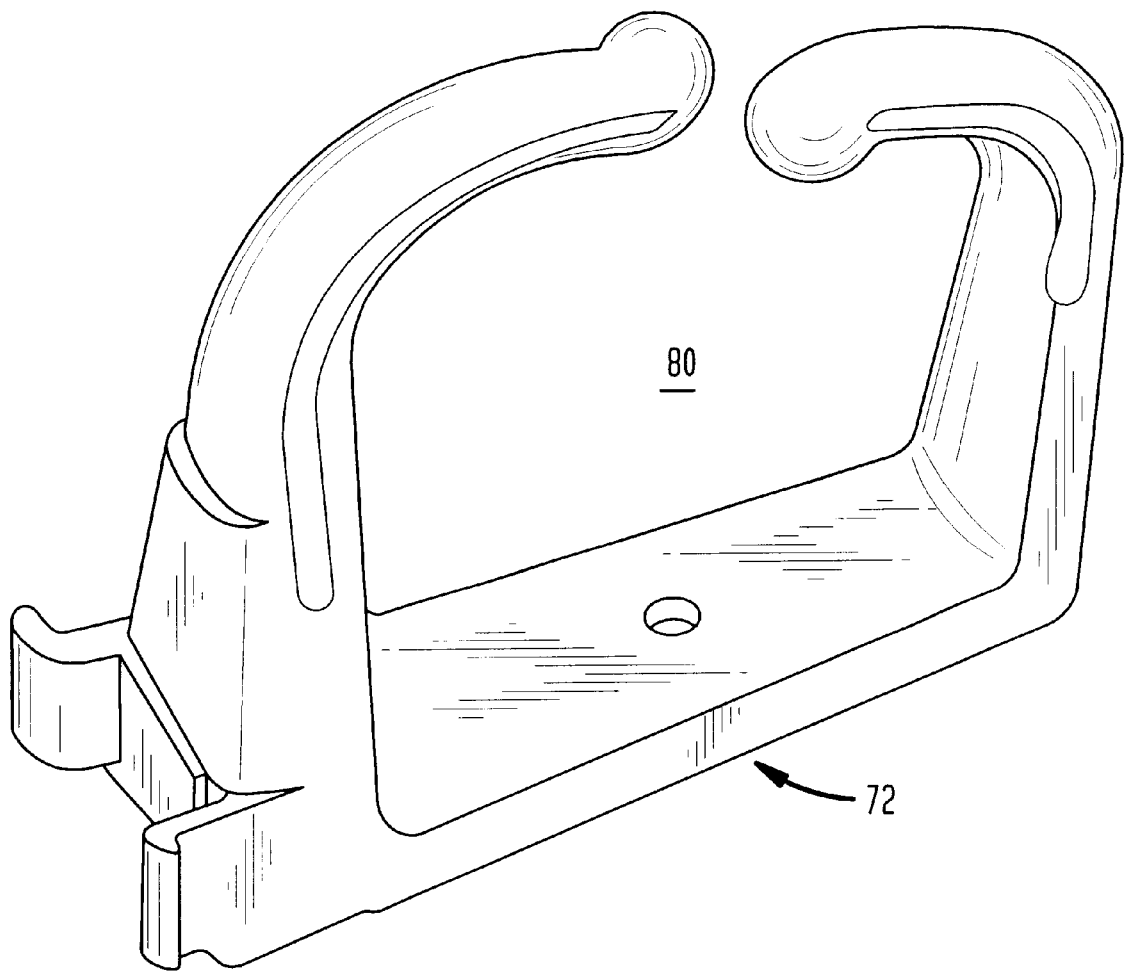
FIG. 2 shows a perspective view of one of the wiring troughs of FIG. 1.

In addition, one of the pieces (e.g., female piece 304, in the embodiment of FIGS. 3–5) has extensions 322 and 324 that are designed to engage structure on the side of a building entrance protector, such as BEP 10 of FIG. 1, to removably mount the wiring trough assemblage to the BEP.

The resulting two-piece assemblage provides an expandable wiring trough that can be used with building entrance protectors, such as BEP 100 of FIG. 1. Such an expandable wiring trough can be compressed, as in FIGS. 5A–B, when it needs to accommodate only a relatively small amount of wiring, and expanded, as in FIGS. 4A–B, when it needs to accommodate a relatively large amount of wiring. As such, the wiring troughs of the present invention provide a solution to problems associated with the large amounts of wiring that need to be handled when two or more BEPs are mounted end to end on a wall. In particular, the present invention provides wiring troughs that can be configured with a BEP and then expanded as needed, e.g., as more BEPs and more wiring are added to the configuration, without having to replace any existing components and without wasting potentially limited wall space.

Although the present invention has been described in the context of building entrance protectors, those skilled in the art will understand that the present invention can be applied to other types of enclosures for telecommunications equipment in which relatively large numbers of wires are to be terminated.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An expandable wiring trough for an enclosure for telecommunications equipment, the wiring trough comprising a male piece and a female piece, adapted to receive the male piece at a plurality of positions defining an opening having different sizes to accommodate different amounts of wiring, wherein:

the male piece comprises a male arm;

the female piece comprises a female arm defining a cavity adapted to receive the male arm;

the cavity within the female arm defines a saw-toothed first inner surface and a smooth second inner surface having a first stop at a proximal end of the cavity;

the cavity defines only a single saw-toothed inner surface;

the male arm comprises a first extension configured to engage the saw-toothed first inner surface of the cavity within the female arm at the plurality of positions;

the male arm further comprises a second extension configured to engage the first stop at the proximal end of the cavity within the female arm to inhibit the male piece from being removed from within the female piece; and the male piece comprises a retaining arm that is offset in a first direction from a retaining arm of the female piece, wherein the first direction is substantially orthogonal to longitudinal axes of the retaining arms, such that, when the male piece is assembled within the female piece, the retaining arms provide clearance in the first direction while overlapping in a second direction, wherein the second direction is substantially parallel to the longitudinal axes of the retaining arms, to inhibit wires from inadvertently falling out of the opening.

2. The expandable wiring trough of claim 1 wherein:

the cavity within the female arm further defines a smooth third inner surface having a second stop at the proximal end of the cavity; and the male arm further comprises a third extension for engaging the second stop at the proximal end of the cavity within the female arm.

3. The expandable wiring trough of claim 2, wherein:

the first inner surface within the female arm is orthogonal to both the second and third inner surfaces within the female arm;

the first and second extensions extend from mutually orthogonal surfaces of the male arm; and the first and third extensions extend from mutually orthogonal surfaces of the male arm.

4. The expandable wiring trough of claim 1, wherein one of the male and female pieces comprises a structure adapted to removably mount the wiring trough to the enclosure.

5. The expandable wiring trough of claim 1, wherein:

the cavity within the female arm further defines a smooth third inner surface having a second stop at the proximal end of the cavity;

the male arm further comprises a third extension for engaging the second stop at the proximal end of the cavity within the female arm;

the first inner surface within the female arm is orthogonal to both the second and third inner surfaces within the female arm;

the first and second extensions extend from mutually orthogonal surfaces of the male arm;

the first and third extensions extend from mutually orthogonal surfaces of the male arm;

the male piece comprises a retaining arm that is offset in a first direction from a retaining arm of the female piece, such that, when the male piece is assembled within the female piece, the retaining arms provide clearance in the first direction while overlapping in a second direction to inhibit wires from inadvertently falling out of the opening; and one of the male and female pieces comprises a structure adapted to removably mount the wiring trough to the enclosure.

6. The expandable wiring trough of claim 1, wherein:

the first inner surface within the female arm is orthogonal to the second inner surface within the female arm; and the first and second extensions extend from mutually orthogonal surfaces of the male arm.

7. An enclosure for telecommunications equipment, the enclosure having at least one expandable wiring trough, the at least one expandable wiring trough comprising a male piece and a female piece, adapted to receive the male piece at a plurality of positions defining an opening having different sizes to accommodate different amounts of wiring, wherein:

the male piece comprises a male arm;

the female piece comprises a female arm defining a cavity adapted to receive the male arm;

the cavity within the female arm defines a saw-toothed first inner surface and a smooth second inner surface having a first stop at a proximal end of the cavity;

the cavity defines only a single saw-toothed inner surface;

the male arm comprises a first extension configured to engage the saw-toothed first inner surface of the cavity within the female arm at the plurality of positions;

the male arm further comprises a second extension configured to engage the first stop at the proximal end of the cavity within the female arm to inhibit the male piece from being removed from within the female piece; and the male piece comprises a retaining arm that is offset in a first direction from a retaining arm of the female piece, wherein the first direction is substantially orthogonal to longitudinal axes of the retaining arms, such that, when the male piece is assembled within the female piece, the retaining arms provide clearance in the first direction while overlapping in a second direction, wherein the second direction is substantially parallel to the longitudinal axes of the retaining arms, to inhibit wires from inadvertently falling out of the opening.

8. The enclosure of claim 7 wherein:

the cavity within the female arm further defines a smooth third inner surface having a second stop at the proximal end of the cavity; and the male arm further comprises a third extension for engaging the second stop at the proximal end of the cavity within the female arm.

9. The enclosure of claim 8, wherein:

the first inner surface within the female arm is orthogonal to both the second and third inner surfaces within the female arm;

the first and second extensions extend from mutually orthogonal surfaces of the male arm; and the first and third extensions extend from mutually orthogonal surfaces of the male arm.

10. The enclosure of claim 7, wherein the expandable wiring trough is removably mounted onto a wall of the enclosure and one of the male and female pieces comprises a structure adapted to removably mount the wiring trough to the wall of the enclosure.

11. The enclosure of claim 7, wherein:

the cavity within the female arm further defines a smooth third inner surface having a second stop at the proximal end of the cavity;

the male arm further comprises a third extension for engaging the second stop at the proximal end of the cavity within the female arm;

the first inner surface within the female arm is orthogonal to both the second and third inner surfaces within the female arm;

the first and second extensions extend from mutually orthogonal surfaces of the male arm;

the first and third extensions extend from mutually orthogonal surfaces of the male arm;

the male piece comprises a retaining arm that is offset in a first direction from a retaining arm of the female piece, such that, when the male piece is assembled within the female piece, the retaining arms provide clearance in the first direction while overlapping in a second direction to inhibit wires from inadvertently falling out of the opening; and the expandable wiring trough is removably mounted onto a wall of the enclosure and one of the male and female pieces comprises a structure adapted to removably mount the wiring trough to the wall of the enclosure.

12. The enclosure of claim 7, wherein:

the first inner surface within the female arm is orthogonal to the second inner surface within the female arm; and the first and second extensions extend from mutually orthogonal surfaces of the male arm.

13. An expandable wiring trough for an enclosure for telecommunications equipment, the wiring trough comprising:

(a) a male piece comprising a male arm and a retaining arm connected to the male arm; and (b) a female piece, comprising a female arm and a retaining arm connected to the female arm, wherein:

the female arm defines a cavity adapted to receive the male arm at a plurality of positions along a second direction;

when the male piece is configured with the female piece such that the cavity defined by the female arm receives the male arm at one of the positions, the male and female piece define a wire retention area, wherein:

the size of the wire retention area depends on the position of the male arm within the cavity of the female arm along the second direction;

the retaining arm of the male piece is offset from the retaining arm of the female piece in a first direction that is substantially orthogonal to the second direction to enable one or more wires, each of whose two ends are already terminated to electrical equipment, to be fed between the retaining arms and into the wire retention area; and the retaining arm of the male piece overlaps the retaining arm of the female piece in the second direction to inhibit the one or more wires from inadvertently falling out of the wire retention area.

14. The expandable wiring trough of claim 13, wherein the second direction is substantially parallel to longitudinal axes of the retention arms.

15. An enclosure for telecommunications equipment, the enclosure having at least one expandable wiring trough, the at least one expandable wiring trough comprising:

(a) a male piece comprising a male arm and a retaining arm connected to the male arm; and (b) a female piece, comprising a female arm and a retaining arm connected to the female arm, wherein:

the female arm defines a cavity adapted to receive the male arm at a plurality of positions along a second direction;

when the male piece is configured with the female piece such that the cavity defined by the female arm receives the male arm at one of the positions, the male and female piece define a wire retention area, wherein:

the size of the wire retention area depends on the position of the male arm within the cavity of the female arm along the second direction;

the retaining arm of the male piece is offset from the retaining arm of the female piece in a first direction that is substantially orthogonal to the second direction to enable one or more wires, each of whose two ends are already terminated to electrical equipment, to be fed between the retaining arms and into the wire retention area; and the retaining arm of the male piece overlaps the retaining arm of the female piece in the second direction to inhibit the one or more wires from inadvertently falling out of the wire retention area.

16. The expandable wiring trough of claim 15, wherein the second direction is substantially parallel to longitudinal axes of the retention arms.

* * * * *